March 19, 1940.　　H. D. MacDONALD　　2,194,206
WHEEL STRUCTURE
Filed Oct. 15, 1937　　2 Sheets-Sheet 1
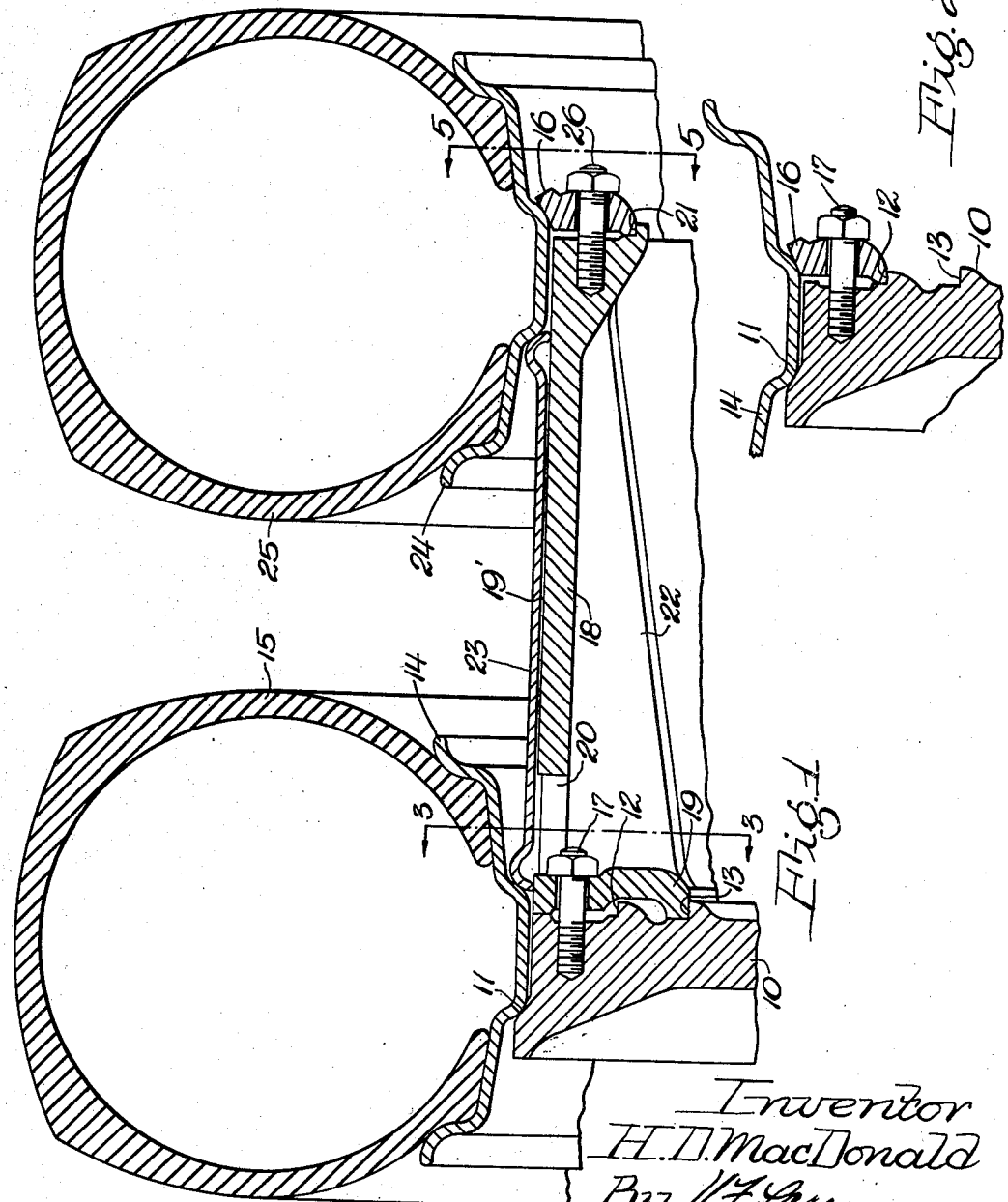

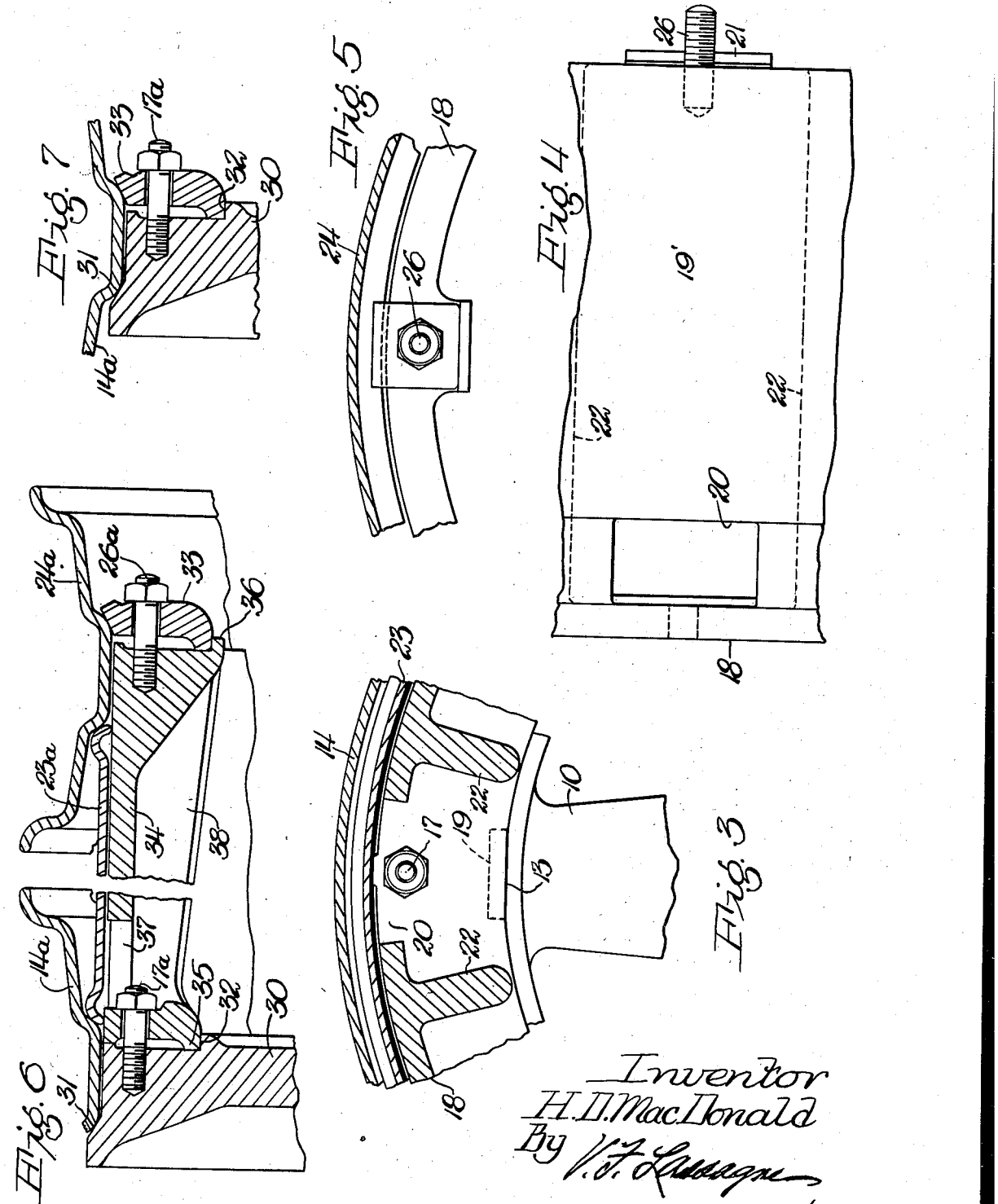

Patented Mar. 19, 1940

2,194,206

UNITED STATES PATENT OFFICE 2,194,206

WHEEL STRUCTURE

Howard D. MacDonald, La Grange, Ill., assignor to International Harvester Company, a corporation of New Jersey Application October 15, 1937, Serial No. 169,216

2 Claims. (Cl. 301—13)

This invention relates to a vehicle wheel and more particularly to an interchangeable wheel mounting adapted for use in converting a single rim wheel to a duel rim wheel.

Previous wheels of the dual and single rim type involving convertible mountings have been characterized by a multiplicity of parts, or in other respects being cumbersome and complicated. This multiplicity of parts is due, in previous constructions, to lack of adaptation of the parts to utilization in both instances when the wheel is employed as a single wheel or as a dual wheel. It is found desirable, therefore, to provide a vehicle wheel structure which involves few parts and which is otherwise simplified and improved, as contemplated by the present invention.

The principal object of the invention is to provide an extension member for attachment to a single rim wheel for the purposes of converting said wheel to a dual rim wheel, said extension member being adapted to be secured to the wheel in place of the lugs formerly utilized to hold the single rim in place on the wheel.

An important object of the invention is to adapt the extension member at its outboard face to accommodate the usual wheel lugs for holding the second rim in place.

Another important object is to provide for the utilization in conjunction with the extension member of an ordinary or conventional type of spacer member for spacing the two rims on the wheel and member when the wheel is utilized in its dual capacity.

Another object is to provide for securing the extension member to the wheel in place of the lugs and by the same securing means.

Still another object is to provide for securing lugs to the outboard face of the extension member by securing means similar or even identical to the aforesaid securing means.

Another object is to provide an annular extension or converting member with peripherally spaced openings adapted to provide access to the securing means utilized to secure the member to the wheel.

Another object is to provide an annular extension member, the outer diameter of which is not greater than the inner diameter of the rim, to facilitate quick and easy removal of the rims.

And specifically, another object is to provide a generally improved, light-weight and sturdy extension member for use in converting a single wheel to a dual wheel.

Briefly, these and other desirable objects are achieved in the practicable forms of the invention illustrated by the provision of an annular extension member adapted to be secured to a wheel of the single rim type in place of the lugs formerly used to hold the single rim in place. A spacer ring of any conventional type is fitted over the extension member and engages an outboard face of the inside rim and an inboard face of the outside rim. The same lugs, previously utilized when the wheel was employed in single capacity, are adapted to be secured to the outboard face of the extension member for supporting the outside rim on the wheel, as now utilized in dual capacity. The same bolts or securing means, previously used to secure the lugs in place on the wheel, are used to secure the extension member on the wheel in place of the lugs. Similar or even identical bolts, or securing means, are used to secure the lugs to the extension member. Openings are provided in the periphery of the extension member adjacent its inboard face to provide access to the bolts used in securing the member to the wheel. In the present embodiment of the invention, the outer diameter of the extension member is not greater than the inside diameter of the rim, which provision facilitates removal of both rims without detaching the extension member.

A more complete understanding of the objects and desirable features of the invention may be had from the following detailed description taken in conjunction with the accompanying sheets of drawings: in which, Figure 1 is a vertical sectional view showing one preferred form of an extension member and its component parts as utilized in converting a single tire-carrying wheel to a dual tire-carrying wheel;

Figure 2 is a similar sectional view showing the relation between the lug and the wheel when the wheel is utilized in single tire-carrying capacity;

Figure 3 is a sectional view taken on the line 3—3 of Figure 1 showing the construction of the extension member;

Figure 4 is a plan view of a portion of the extension member;

Figure 5 is a sectional view taken on the line 5—5 of Figure 1;

Figure 6 is a sectional view similar to Figure 1 showing a slightly modified form of an extension member utilized with a slightly different type wheel; and, Figure 7 is a sectional view of the same, showing the same wheel in single tire-carrying capacity.

Only sufficient portions of the preferred structures are illustrated as is deemed necessary to disclose the invention. Referring particularly to the structures shown in Figures 1 to 5, a rim portion of a wheel is shown at 10, said wheel being provided with an inboard rim engaging surface 11 at its outer periphery. This wheel may be either of the annular or spoke-end type and is formed at its outboard face with a lug seat 12. In this particular embodiment of the invention, a second seat 13 is formed on the wheel radially inwardly of the seat 12. The rim engaging surface 11 is adapted to engage the inboard peripheral face of a tire-carrying rim 14. This rim may be of any conventional type, and as shown in the drawings, is of the so-called semi-drop-center type. The rim is adapted to carry a pneumatic tire 15 in the well known manner. As shown in Figure 2, wherein the wheel is utilized in single tire-carrying capacity, the tire-carrying rim 14 is supported on the wheel 10 between the rim engaging surface 11 and a lug 16 secured to the outboard face of the wheel by securing means in the form of a stud or bolt and nut 17. In this particular instance, the lug 16 is accommodated by the lug seat 12 formed on the wheel 10. With the lug secured to the wheel in this position, it is adapted to engage the outboard face of the drop-center portion of the rim for securing the same to the wheel, as is well understood by those skilled in the art. It will be understood, of course, that there is a plurality of lugs and bolts disposed in spaced angular positions about the wheel adjacent its periphery; and since these lugs and bolts are all identical, only one of each has been described as sufficient to disclose the invention.

When the single wheel is to be converted to a dual wheel, an extension member or converter 18 is secured to the wheel in place of the lugs 16 and by the same securing means as shown in Figure 1. At its inboard face, the member 18 is provided with angularly spaced projections 19 adapted to fit in the seats 13 formed on the wheel. This member is preferably formed as a one piece ring-like member to afford simplicity in handling, and strength and rigidity in construction, although it will be understood that a plurality of separate, axially extending members could be employed in lieu of the annular member. However, since an annular member is desirable from the standpoint of eliminating numerous parts and otherwise facilitating handling, such a type of annular extension member will be described in connection with the invention.

The extension member or converter 18 comprises a substantially cylindrical outer portion 19', the greatest diameter of which is not greater than the inside diameter of the drop-center portion of the rim 14, for a purpose to be later described. Adjacent its inboard face, the member 18 is provided with a plurality of peripherally spaced openings 20 to provide access to the securing means 17 when the member is secured to the wheel 10. At its outboard face, the member 18 is provided with a plurality of angularly spaced seats 21 adapted to accommodate the lugs 16 when the wheel is utilized in dual tire-carrying capacity. The member 18 is provided radially inwardly of the cylindrical portion 19' with a plurality of angularly spaced strengthening ribs 22.

When the wheel is utilized in dual tire-carrying capacity, the extension member 18 is secured thereto, as previously described, with the rim 14 and tire 15 remaining in place on the wheel. A spacer member or ring 23 is fitted over and surrounds the member 18, the inboard peripheral face of said ring abutting the outboard face of the drop-center portion of the rim 14. This spacer member or ring 23 may be of any conventional type, as previously used in dual wheel constructions. It will be noted that the axially opposite faces of the member 23 are identical or substantially so, and the outboard face abuts the inboard face of the drop-center portion of a second tire-carrying rim 24, which carries a pneumatic tire 25 similar to the tire 15. It will be noted from the drawings, that the rims 14 and 24 are identical as are the tires 15 and 25. The lug 16 is secured to the outboard face of the extension member 18 in the seat 21 provided thereon. The lug is then held in place by a securing means 26 in the form of a stud or bolt and nut, similar or even identical to the stud or bolt and nut 17. The outer portion of the lug 16 engages the outboard face of the drop-center portion of the rim 24, and thus the wheel is converted from a single tire-carrying wheel to a dual tire-carrying wheel, it being noted that the rims 14 and 24 and the ring 23 are supported between the rim engaging surface 11 on the wheel 10 and the lug 16 secured to the outboard face of the extension member 18.

In the modification shown in Figures 6 and 7, the construction is very similar to that just described, there being slight differences in the extension member or converter and in the wheel. In the modification, a wheel 30 is provided with a rim-engaging surface 31 similar to the rim-engaging surface 11 on the wheel 10. At its outboard face, the wheel 30 is provided with but one seat 32 in place of the two seats 12 and 13 formed on the wheel 10. Correspondingly, as shown in Figure 7, a tire-carrying rim 14a is supported on the wheel between the rim-engaging surface and a lug 33 secured to the wheel by securing means 17a, the lug being accommodated by the seat 32. When this type of construction is to be converted from a single wheel to a dual wheel, an extension member 34 substantially identical to the extension member 18 is employed. At its inboard face, the extension member 34 is provided with a projection 35 which fits in the seat 32 formed on the wheel 30. At its outboard face, the member 34 is provided with a seat 36 which accommodates the lug 33 when the wheel is utilized in dual tire-carrying capacity. This lug is secured to the member 34 by securing means 26a and engages the outboard face of the drop-center portion of a rim 24a similar to the rim 24. A spacer member or ring 23a similar to the ring 23 is employed in the construction shown in Figure 6, and operates in the same capacity as the ring 23 in the construction shown in Figure 1.

It will be understood that the wheel 30 is provided with a plurality of angularly spaced lug seats 32 and securing means 17a, as previously described in connection with the description of Figures 1 to 5, it being deemed sufficient to describe but one of each. Similarly, the extension member 34 is provided at its inboard face with a plurality of projections 35, and at its outboard face with a plurality of lug accommodating seats 36. Adjacent its inboard face, the member 34 is provided with a plurality of peripherally spaced openings 37 for providing access to the securing means 17a. The member is also provided with a plurality of angularly spaced strengthening ribs 38 similar to the strengthening ribs 22 on the extension member 18. In various respects, the two extension members 18 and 34 are identical, except for slight differences of structure in the formation of the projections 13 and 35, respectively, and in the lug accommodating seats 21 and 36, respectively. The main difference in the two extension members lies in the provision whereby the member 34 may be secured to the wheel 30 in place of the lug and in the same seat and by the same securing means, whereas the projection 19 on the extension member 18 is accommodated by the seat 13 and in the lug seat 12 formed on the wheel 10. However, these are slight structural differences, and it will be understood that either of the extension members may be used with the same facility in handling, it being necessary only that the wheel be provided with radially spaced seats, such as the seats 12 and 13 when the extension member 18 is used.

Like the extension member 18, the extension member 34 is provided with its greatest diameter not greater than the inside diameter of the drop-center portion of the rim 14a.

The following description pertains specifically to the advantages and features of the construction shown in Figures 1 to 5, but it will be understood that the same advantages and features are present in the construction shown in Figures 6 and 7. The extension member 18 is provided with its greatest diameter not greater than the inside diameter of the drop-center portion of the rims, as previously mentioned, for the purpose of permitting the rims to be installed or removed without removing the extension member. It may be noted from an examination of the drawings that the extension member 18 could well be provided with integral radially extending portions for utilization in place of the outer peripheral portions of the ring 23. However, with an extension member of this type, it would be necessary to remove the entire extension member plus the outboard tire 25 in the event that it became necessary to remove the tire 15. Thus, it will be appreciated that a desirable feature of the invention exists in the cooperation of the two separate parts 18 and 23. This provision becomes more important when it is considered that one of the primary objects of the invention is to provide for the conversion of a single wheel to a dual wheel without handling a multiplicity of complicated and cumbersome parts.

It will be understood that numerous other alterations and modifications may be made in either or both of the constructions described above without departing from the spirit and scope of the invention, as defined in the appended claims.

What is claimed is:

1. In a vehicle wheel having a surface adapted to engage a drop-center tire-carrying rim, a plurality of lugs adapted to engage the drop-center portion of the rim, said rim being adapted to be supported on the wheel between the lugs and the surface, and a plurality of means for securing the lugs to the wheel, the combination with the wheel of a second drop-center tire-carrying rim, means for adapting the wheel to support said second rim adjacent the first rim, said means comprising an integral annular extension member adapted to be secured to the wheel in place of the lugs and by the same securing means the diameter of said member being less than the diameter of the drop-center portion of the first rim, said member being provided with a plurality of openings adapted to provide access to said securing means, an annular spacer adapted to cooperate with the extension member between and engaging the respective sides of the drop-center portions of the rims, the aforesaid lugs being secured to the first member for engaging the drop-center portion of the second rim to support the rims between lugs and the wheel, and a plurality of securing means for securing the lugs to the first member.

2. In a vehicle having an inboard surface adapted to engage the inboard surface of the well of a drop-center tire-carrying rim, the wheel being formed with a plurality of seats, a plurality of lugs adapted to engage the outboard surface of the well of said rim and to fit the seats to support the rim on the wheel, and a plurality of securing means for securing the lugs with the outboard face of the wheel, the lugs being adapted to be disposed radially inwardly of the outward periphery of the wheel, the combination with the wheel of a second drop-center tire-carrying rim, means for adapting the wheel to support said second rim adjacent the first rim, said means comprising an annular extension member adapted to be secured to the outboard face of the wheel in place of the lugs and by the same securing means, the diameter of said member being less than the diameter of the drop-center well of the first rim, said member being provided adjacent its inboard side with a plurality of openings adapted to provide access to the securing means, a ring adapted to surround said member between the rims and adapted to engage the outboard surface of the well of the first rim and the inboard surface of the well of the second rim, the aforesaid lugs being secured to the outboard face of the member for engaging the outboard surface of the well of the second rim to support the rims between the lugs and the inboard wheel surface, and a plurality of securing means for securing the lugs to the first member.

HOWARD D. MacDONALD.